United States Patent Office 2,981,709
Patented Apr. 25, 1961

2,981,709

METHOD OF PRODUCING RUBBER LATEX

John Y. L. Kao, Lombard, Ill., assignor to
F. D. Farnam Co., a corporation of Illinois No Drawing. Filed Feb. 8, 1957, Ser. No. 638,920

3 Claims. (Cl. 260—23.7)

The present invention relates to improvements in the emulsion polymerization of monomers and to the improved synthetic latices thus produced. More particularly, the invention is directed to an improvement in the aqueous emulsion polymerization of monomeric material, production of unique polymer compositions by way of to produce latices having improved resistance to aqueous and oleaginous liquids.

The production of synthetic rubber latices is a well-known and highly developed art wherein monomeric materials are polymerized, commonly in aqueous emulsion form and in the presence of catalysts, surface active agents such as alkali metal soaps of fatty acids or of rosin acids, or anionic and cationic emulsifiers of one or another well-known kind.

The selection of the non-monomer components, in a specific emulsion polymerization reaction depends, to some extent at least, on the identity of the monomeric materials being polymerized, on the time, temperature and pressure conditions during polymerization, and on the ultimate use to which the resulting latex is to be put. For example, it is known that latices formed of butadiene-styrene polymers of general utility can be produced when the polymerization temperature is of the order of 35° to 50° C. and rosin acid soaps comprise the emulsifiers. Polymerization of these same monomers at lower temperatures, however, is carried out more effectively when the rosin acid soaps are replaced by fatty acid soaps. Time, temperature and kind of catalyst also have some effect on the resultant polymer.

The latices resulting from the polymerization of, for example, butadiene with styrene or with acrylonitrile, or latices of the polychloroprene type, contain emulsifiers and other additives comprising the reaction mixture undergoing polymerization. In the production of dry rubber, washing of the copolymer latex coagula may result in removal of some of the aforesaid materials. This is not always resorted to, nor indeed is it generally practical to remove all or substantially all of them. For applications involving the use of latices directly, such as the coating or impregnation of fibrous materials used for certain types of gaskets and the like, the presence in the said latex of conventional emulsifiers will affect the resistance to the action of water or petroleum products with which the material may come in contact.

My invention is directed to the production of latices having improved resistance to both the deleterious action of water and of petroleum products by substituting fatty acids or fatty acid soaps which are highly unsaturated for the conventional emulsifiers used in the emulsion polymerization of latices. The improvement is believed to be due to some chemical reactions involving the unsaturated emulsifier alone, or the unsaturated emulsifier and the unsaturated copolymers, either in the dry coagulum of the latex or in the deposited particles or film of the latex in the coating or impregnating of fibrous materials. These reactions will take place in the presence of various chemicals, such as are commonly used in paint and rubber technology.

Generally speaking, emulsifiers having an iodine number of the order of that of linseed oil, soybean oil, tung oil, and like drying oils, work very well. In most cases, an emulsifier derived from an oil having an iodine number from, about 100 to 170, or above, is desirable, with products having the higher iodine numbers being preferred, other things being equal.

It is to be understood, of course, that my invention envisions the use not only of conventional soaps of high iodine number oils, but also of oils which have been chemically modified, such as boiled or blown linseed oil. Such products may be used alone or in admixture with other saturated or unsaturated oil derivatives.

In general, as can be seen from the foregoing, my invention involves forming an aqueous emulsion of the desired monomer components from which a latex is to be made by using unsaturated fatty acid soap as the sole or major component of the emulsifier. The pH of the reaction system may be adjusted as desired in accordance with well-known practice, and the reaction system to which has also been added conventional amounts of polymerization catalyst, agitated at the usual polymerization temperatures until the desired amount of polymerization has occurred.

The amount of emulsifier used in accordance with this invention is widely variable and may range, for example, from 0.1% to 20% based on the monomers.

While the latices with which the present invention is primarily concerned are those represented by butadiene-styrene, butadiene-acrylonitrile, and polychloroprene, my invention is applicable in its broad aspects to any latex wherein the resulting polymer contains unsaturated bonds.

The essence of this particular technique is to utilize various chemical reactions, such as those occurring during the vulcanization of rubber, to produce bonding between the unsaturated copolymers and unsaturated fatty acid of the emulsifier, and thereby effect a polymer structure of improved resistance to water and petroleum products, and of improved physical and electrical properties.

By way of résumé, my invention represents an improvement in the technique of producing latices which exhibit outstanding performance characteristics when used under conditions wherein resistance to the action of petroleum products and water is desired, such as for coating or impregnating gaskets and the like. The invention is applicable in a broader sense to the production of improved synthetic latices of the type which contain unsaturated double bonds in the polymer structure as represented, for example, by the polymers of the butadiene-styrene, butadiene-acrylonitrile, and polychloroprene types. The emulsifiers of choice used in the practice of this invention are the fatty acids of such oils, as hereinbefore specified, and fatty acid soaps, the aliphatic portions of which are highly unsaturated, having iodine numbers of the order of that found in linseed oil, tung oil, soybean oil and other drying or semi-drying oils. The alkali metal soaps of such fatty acids are generally desirable for most uses, although other soaps than those formed by alkali metals can be used.

Ordinary polymerization catalysts, such as those of the class referred to in the art as the peroxygen catalysts, with or without conventional promoters, are used in the amount and manner known in this art.

By way of example, linseed oil saponified with sodium hydroxide, when used as the emulsifier in the emulsion polymerization of mixtures of butadiene and styrene, and butadiene and acrylonitrile, using the conventional procedures, reaction components (except that saponified linseed oil is used in amounts equal to N-dodecyl-beta-alanine) and reaction conditions used in the illustrative examples of U.S. Patent No. 2,684,954 result in a latex having unusual properties of oil and water resistance.

Since certain changes in carrying out the above process may be made without departing from the scope of this invention, it is intended that all matter contained in the foregoing descriptive material shall be interpreted as illustrative only.

I claim:

1. In the emulsion polymerization of unsaturated monomeric materials to produce a synthetic rubber latex which upon processing and vulcanizing yields a product of improved resistance to water and petroleum products, the improvement which comprises using as essentially the sole emulsifying agent in forming an aqueous emulsion of said monomeric materials the soluble salt of an unsaturated fatty acid having an iodine number greater than about 100.

2. The process according to claim 1 wherein the latices produced are selected from the group consisting of butadiene-styrene and butadiene-acrylonitrile.

3. The process according to claim 1 in which the soluble unsaturated fatty acid salt emulsifying agent is obtained by saponification of linseed oil.

References Cited in the file of this patent

UNITED STATES PATENTS

| | | |
|---|---|---|
| 2,300,056 | Meis et al. | Oct. 27, 1942 |
| 2,373,753 | Fryling | Apr. 17, 1945 |

FOREIGN PATENTS

| | | |
|---|---|---|
| 592,913 | Great Britain | Oct. 2, 1947 |

OTHER REFERENCES

Brewster: "Organic Chemistry," 2nd edition, 1948, Prentice-Hall, page 241.

Wilson et al.: Industrial and Engineering Chemistry, volume 40, March 1948, pages 530-534.